Figure 1:
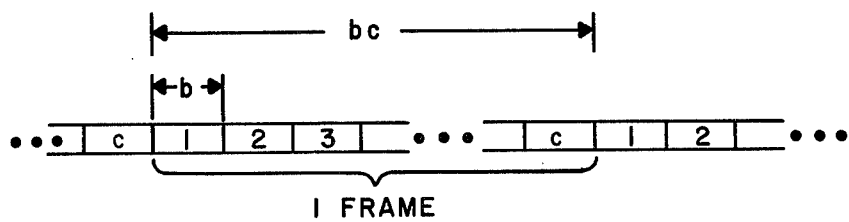

United States Patent [19]

Collins et al.

[11] 4,005,272
[45] Jan. 25, 1977

[54] TIME FOLDED TST (TIME SPACE TIME) SWITCH

[75] Inventors: Arthur A. Collins; Robert D. Pedersen; John C. Bellamy, II, all of Dallas, Tex.

[73] Assignee: Arthur A. Collins, Inc., Dallas, Tex.

[22] Filed: Aug. 14, 1974

[21] Appl. No.: 497,214

[52] U.S. Cl. .......................................... 179/15 AQ
[51] Int. Cl.² .......................................... H04J 3/00
[58] Field of Search ....... 179/15 AQ, 15 AT, 15 A, 179/15 AA; 343/175

[56] References Cited

UNITED STATES PATENTS

| | | | |
|---|---|---|---|
| 3,461,242 | 8/1969 | Inose et al. | 179/15 AQ |
| 3,573,381 | 4/1971 | Marcus | 179/15 AQ |
| 3,688,049 | 8/1972 | Schlichte | 179/15 AQ |
| 3,705,266 | 12/1972 | Philip | 179/15 AT |
| 3,740,483 | 6/1973 | Pedersen | 179/15 AQ |
| 3,760,103 | 9/1973 | Condon | 179/15 AQ |
| 3,812,294 | 5/1974 | Pedersen | 179/15 AQ |
| 3,818,142 | 6/1974 | Edstrom et al. | 179/15 AQ |
| 3,840,704 | 10/1974 | Baugh | 179/15 AQ |

*Primary Examiner*—Kathleen H. Claffy
*Assistant Examiner*—Joseph A. Popek
*Attorney, Agent, or Firm*—Warren H. Kintzinger

[57] ABSTRACT

A time folded time space time (TST) switch with the establishing of a communication through path in one direction automatically establishing a path in the opposite direction in an adjacent time slot. With one transfer through a space switch made during an even time slot, the other transfer is made in a symmetrical fashion during the following odd time slot. This time folded TST switch selectively interconnects digital bi-directional Time Division Multiplexed (TDM) transmission paths.

4 Claims, 10 Drawing Figures

TIME FOLDED TST (TIME SPACE TIME) SWITCH

This invention relates in general to time space time (TST) telecommunication system switches, and, in particular, to time folded TST switches for interconnecting digital Time Division Multiplex (TDM) communication lines, with both path connections required for a completed communication link automatically established in one operation, with a second path the mirror image of the first path.

Time Space Time (TST) switches are a particularly useful configuration of switching elements providing both time and space translation between channels of Time Division Multiplexed (TDM) telecommunications transmission lines. A TST switch interconnects digital bi-directional TDM communication lines with TDM communication involving the sharing of single transmission paths, individually, in time to provide multiple channels in a single transmission medium. This is a fundamental system improvement in telephone communications that should prove helpful in reducing cost of ordinary telephone service, and in enhancing the ability to provide many new kinds of service, in meeting expanded communications needs. Electromechanical crossbar and relay switching systems, as generally used today in telecommunications switching, have, for practical purposes, reached the limit of their capabilities. Extensive, continued adherence to these older technologies severely restricts capability, and greatly increases costs of telecommunication systems; and, particularly so with expansion to systems of great size and complexity. While many advances have been made in capability and efficiency in the transmission area, with microwave, satellite, and high-capacity cable, and with both analog and digital repeaters and terminals being used, the exchange plant, including switching equipment in central offices and branch exchanges, remain in essence the same as in the very early days. Recent advances in solid state technology make the use of all digital switching and transmission techniques more attractive today than ever before.

The advent of digital multiplex transmission systems gives rise to many possibilities; particularly with TDM multiplex terminals beginning to look like switches. Message signals in these terminals appear in "time slots," and transfer of signals between time slots is accomplished by a "time slot interchange," with time-division switches connected directly to multiplex transmission lines. Another important saving is accomplished through elimination of digital-to-analog, and analog-to-digital, conversions of every switch. The existing local exchange area plant represents the major part of telephone plant investment, and the least efficient portion of the system—with large quantities of scarce materials required. Further, physical congestion problems are encountered with entrance cables as they approach the central office, and, many times, there are difficult growth problems in central office main distribution frames. Present central office switching includes bulky electromechanical switching stages located in large, costly building space. Costs for new construction and maintenance of such traditional exchange area plants are constantly increasing, particularly with large cable networks employed when cable pair utilization is inherently very low with a dedicated physical wire pair used to connect each subscriber station to its central office. Thus, system improvements attainable with time division transmission and switching techniques are very significant. This has led to Time Space Time (TST) switching structures, and, with some TST switches, an improved "folded" operation configuration. Folded operation TST switches are provided not only with a single stage square switch as a single space switch stage, but also as larger switches having multiple stage space switching sections. Connect and disconnect procedures are simpler with folded operation TST switches since a second path is automatically specified whenever the first path is selected. Thus, only one pathfinding operation is required in a folded switch, and the disconnect procedure is simpler since both paths can be released simultaneously. Blocking problems are reduced by one half with a second path through the switch automatically available when an idle first path is found. Further, control information for the two paths can be shared, thereby providing some economy in the size of the control store.

It is therefore a principal object of this invention to provide a time folded time space time (TST) switch system achieving great improvements in operation in selectively interconnecting digital bi-directional Time Division Multiplexed (TDM) transmission paths.

Another object is to minimize equipment costs, while achieving improved reliability and lessened maintenance requirements through use of time folded TST switches.

A further object is to reduce signal path switch blocking problems through use of such time folded TST switches.

Still another object is to simplify switch connect and disconnect procedures with a second through switch path being automatically specified whenever the first path is selected.

Another object is to achieve a further reduction in equipment requirements through control information sharing with time folded TST switches.

Features of this invention useful in accomplishing the above objects include, in a time folded TST (time space time) switch, the selective controlled interconnection of digital time division multiplex (TDM) communication paths, with both path connections required for a completed communication link automatically established in one operation, with a second path, the mirror image of the first path. The time folded operation involves using separate time slots (usually adjacent time slots) for the two paths of each full duplex connection. Thus, the time folded operation makes it possible to share path elements for both directions of a full duplex connection. Time folded operation with the use of separate time slots for each direction of a connection can also reduce the speed requirements of the time stage memories. When two channels of the same TDM input are being interchanged (switched), two accesses to the same inlet and two accesses to the same outlet are required. If the interchange is made during one space switch time slot, two accesses of each inlet memory and each outlet memory are required during the one time slot. With applicant's time folded TST switch units, however, only one access per memory is required during each space switch time slot.

Figure 2:
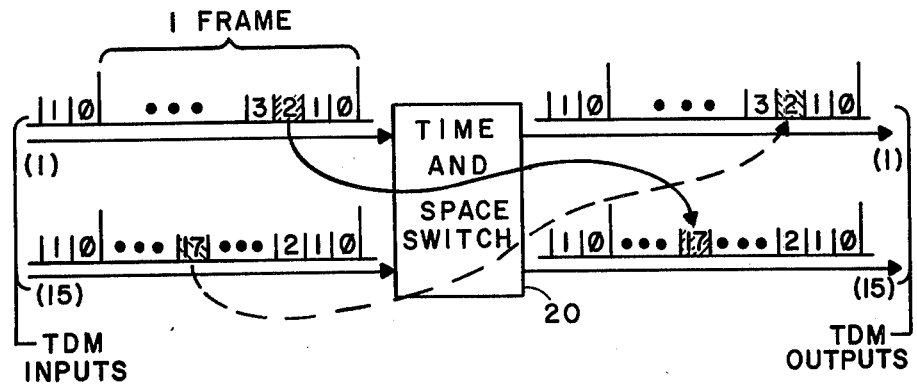
Figure 3:
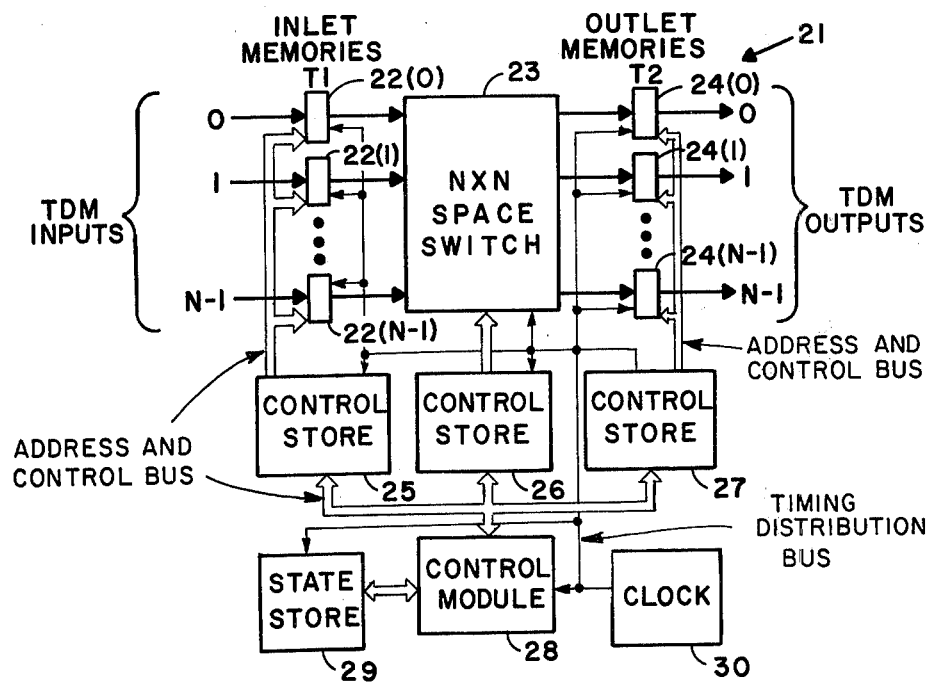
Figure 4:
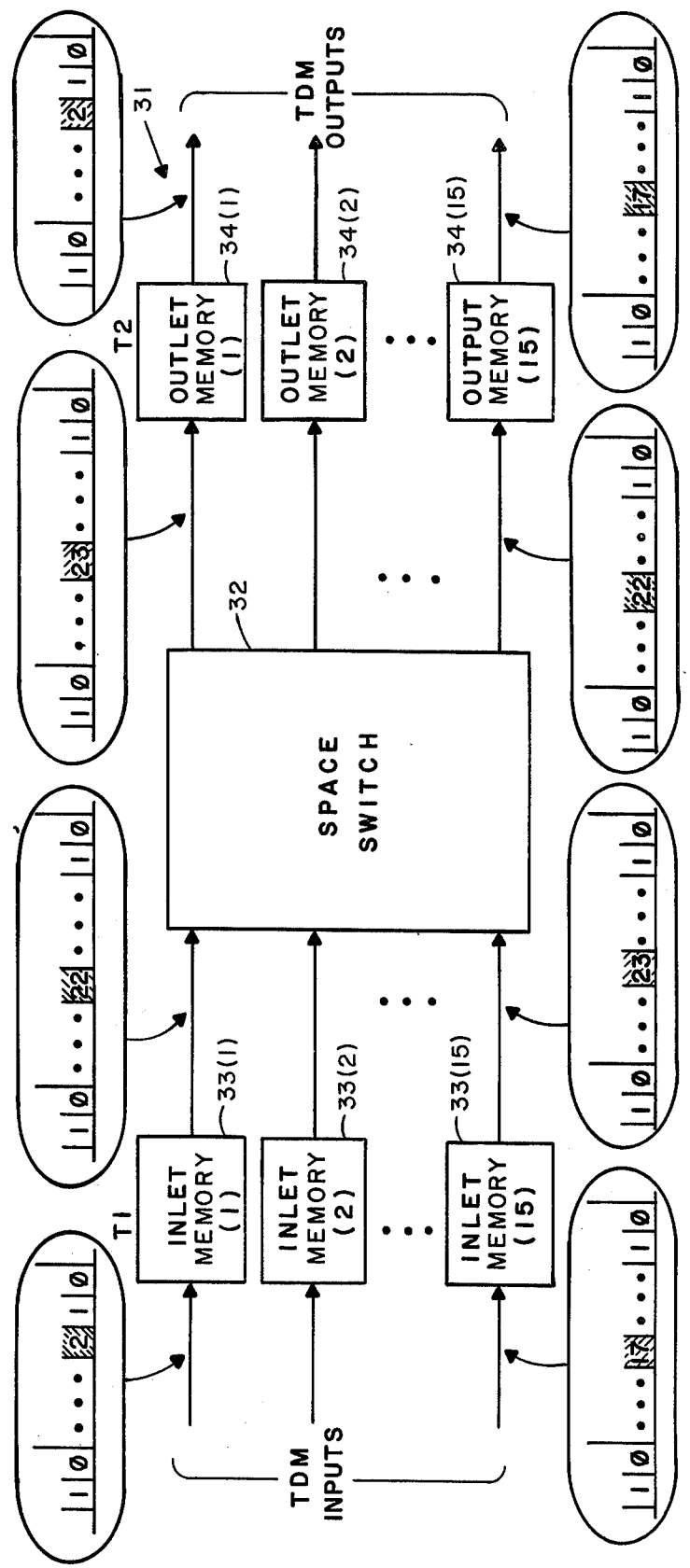
Figure 5:
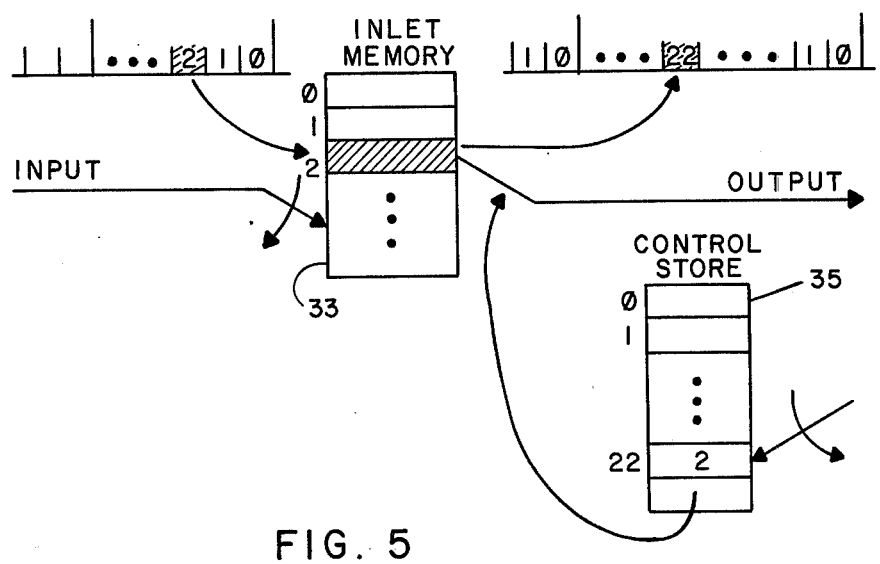
Figure 6:
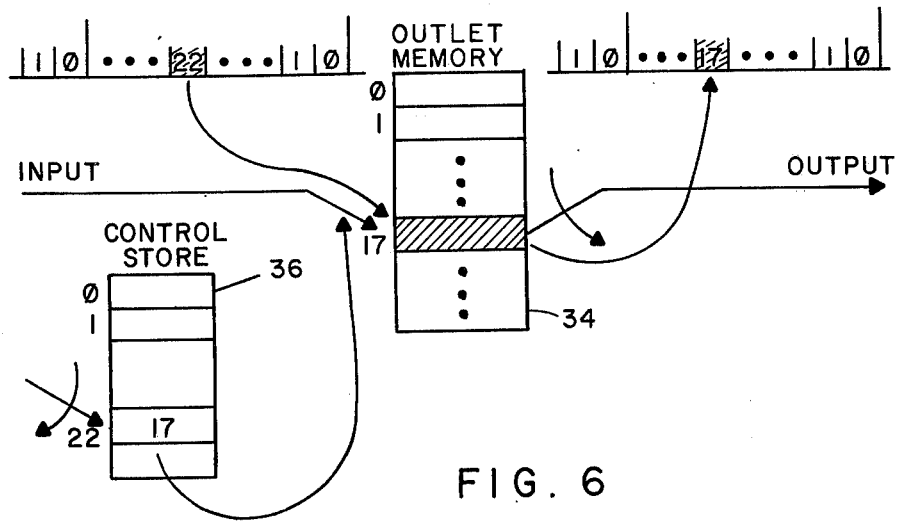
Figure 7:
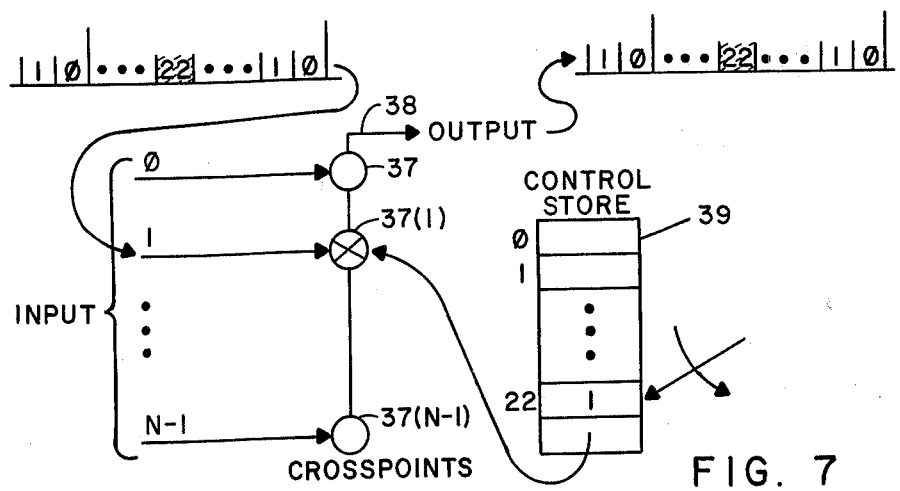
Figure 8:
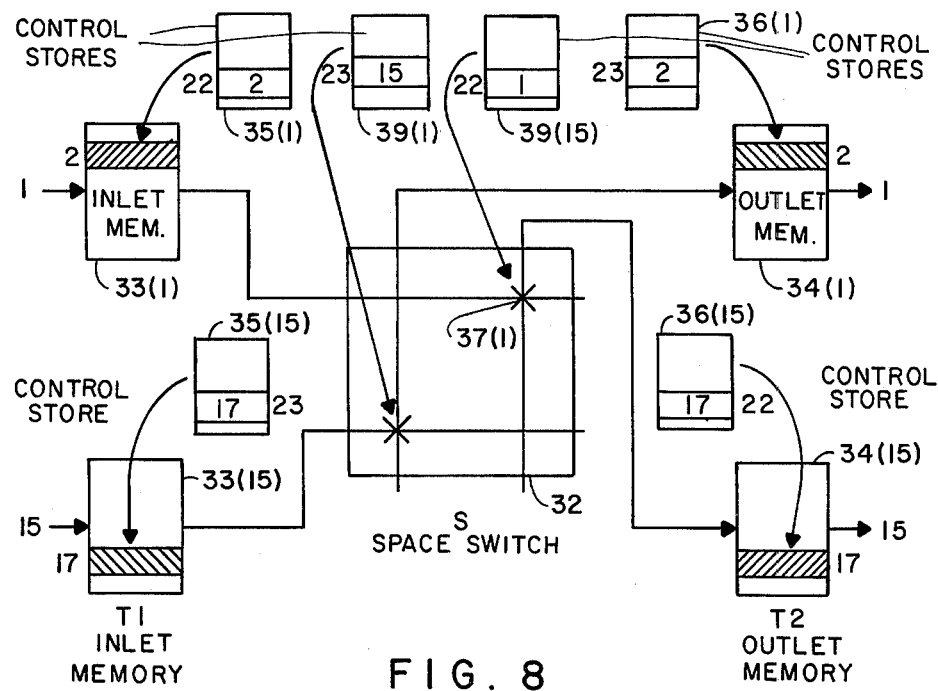
Figure 9:
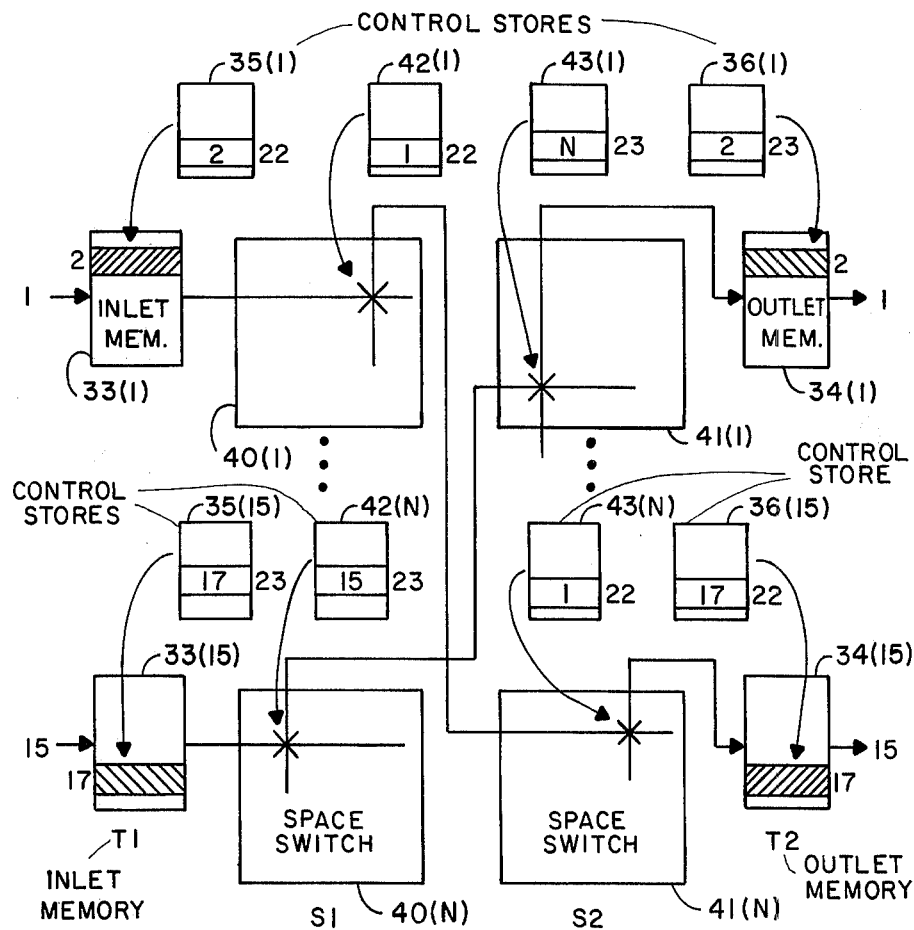
Figure 10:
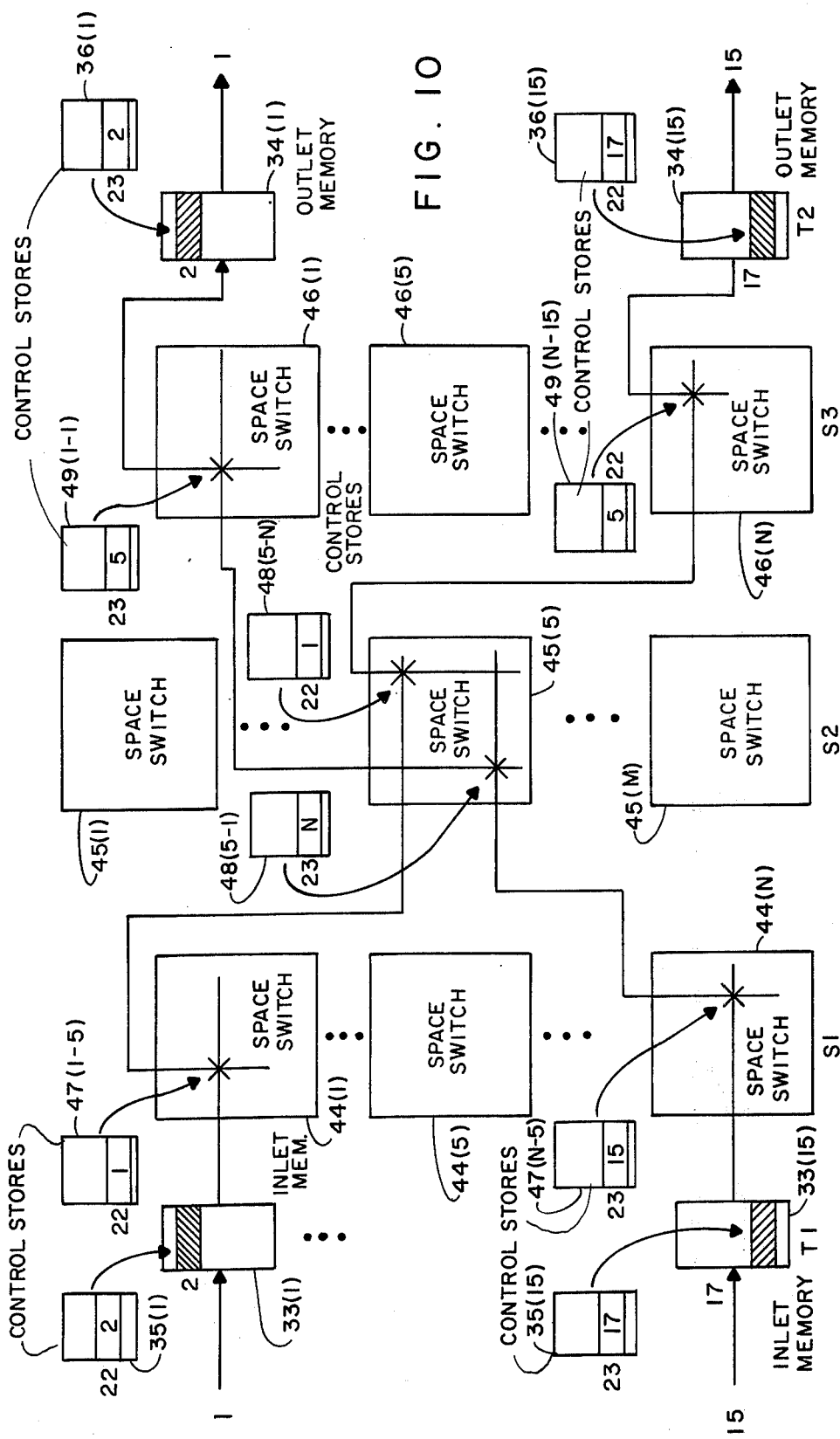

Specific embodiments representing what are presently regarded as the best modes of carrying out the invention are illustrated in the accompanying drawings wherein:

FIG. 1 represents a graphic showing of a format for time division multiplexing (TDM) of digital data;

FIG. 2, a combination graphic and schematic block showing of a TDM input-output time and space switch unit;

FIG. 3, a block schematic showing of a basic TST switch configuration with control elements also indicated;

FIG. 4, a block schematic showing of a basic TST switch, such as shown in FIG. 3, with TDM channel content indicated for various pertinent input and output locations with time folded operation of the TST switch;

FIG. 5, a graphic-conceptual showing of a time switch inlet memory TDM channel content translation in time through the memory with associated control store direction;

FIG. 6, a graphic-conceptual showing of a time switch outlet memory TDM channel content translation in time through the memory with associated control store direction;

FIG. 7, a graphic-conceptual showing of space switch operation with associated control store direction;

FIG. 8, a graphic-conceptual showing of a TST switch unit with a single space switch stage in time folded operation;

FIG. 9, a graphic-conceptual showing of a TST switch unit with two space switch stages in time folded operation; and, FIG. 10, a graphic-conceptual showing of a TST switch unit with three space switch stages in time folded operation.

Referring to the drawings:

Time folded operation of a Time Space Time (TST) switch not only simplifies TST switch operating procedure, but also leads to simplified hardware implementations, improved reliability, and significant savings. As a preliminary step to describing applicants' improved time folded TST switch operation, a description of a basic TST switch and its operation is provided. TST switches are designed to interconnect a number of digital Time Division Multiplex (TDM) communication lines with TDM involving the sharing of individual single transmission paths in time. This is with $c$ communication channels established by dividing time into $c$ slots. Thus, as shown in FIG. 1, each set of $c$ time slots constitutes a frame during which each communication is allowed to send a single word of $b$ bits. In typical digital voice systems, 8-bit words are generated at an 8 KHz rate and, thereby, a pair of 1.536 mbps transmission links are capable of carrying 24 separate conversations. Similary, an 8.192 mbps link could accommodate 128 64 kilobit per second channels. When such communication channels are switched from one TDM transmission link to another, both time and space translation is required, such as illustrated in FIG. 2. In FIG. 2, TDM inputs (1) and (15), of a plurality of input lines, are shown to feed time and space switch 20 with TDM outputs (1) and (15), of a plurality of output lines emanating therefrom. Channel 2 of the TDM input line (1) is connected to channel 17 of the TDM output line (15), and, with full duplex communication requiring a two-way circuit, a second connection path is established, as indicated by the dotted line, transferring channel 17 of TDM input line (15) to channel 2 of TDM output line (1). A procedure for operating a digital time division switch such that both connections are automatically established in one operation, with the second path a mirror image of the first path in a folded operation, is described in greater detail hereinafter, particularly, "time folded" operation for TST switches.

A basic TST switch configuration 21 is shown in FIG. 3, with the first stage T1 of the switch being N inlet memories (actually 0 through N-1) 22(0), 22(1) ... 22(N-1) one for each of the O through N-1 TDM inputs, respectively. The c channel words from each input are stored in c successive addresses of the respective inlet memories with these words then held in the memories until they are transferred through the space switch 23 to the outlet memories 24(0), 24(1) ... 24(N-1) in the third stage T2, space switch 23 actually being the second stage, where the words are held in outlet memories until they are released on respective 0 through N-1 output TDM lines. Hence, the first stage represents a time switch in that data occurring in the input channels is translated in time to a time slot during which the space switch 23 transfer takes place. The T2 outlet memories 24(0), 24(1) ... 24(N-1) receive data words from space switch 23 and store them in addresses corresponding to the desired output channel with the time division outputs 0 through N-1 then obtaining their data by successive locations of respective outlet memories being addressed. Associated with each inlet memory, space switch stage output, and outlet memory, is a control memory that contains $l$ words corresponding to the $l$ time slots during which data is transferred through the space stage 23. The individual control memories may be separate or may be collected together in control stores such as control stores 25, 26, and 27, for the T1 inlet memories, the space switch 23 stage outputs, and the T2 outlet memories, respectively. The control stores 25, 26, and 27, specify which space switch crosspoints are selected and which inlet and outlet memory locations are accessed during each switch time slot, with the control stores being accessed in cyclic fashion so that each connection is repeated, at the same time, during every frame. Address and control information is transferred from the control memories to the inlet and outlet memories and between the control stores and the control module via the address and control buses, as indicated in FIG. 3.

Establishing a connection through a TST switch, from a selected inlet memory to a selected outlet memory, involves finding a time slot during which the selected inlet memory, the selected outlet memory, and an appropriate space path are idle. Thus, the pathfinding operation in a TST switch involves a time search as well as a space search. The space switch connections are time division multiplexed with $l$ time slots per frame, and when $l$ is greater than $c$, the switch is said to be operating with time expansion. The larger $l$ is, the more transfer opportunities there are through the space switch 23. Thus, for given size space switches 23, greater time expansions imply lower blocking probabilities, and for a non-blocking space switch 23 when $l$ is increased to $2c-1$ the TST blocking probability is reduced to zero.

The control module 28 sets up and takes down connections in response to requests and disconnects, acting through the control stores 25, 26, and 27. In setting up calls, the control module 28 accesses state store 29, that stores the status of every switching element during every switch time slot, to determine idle switching paths and available time slots. Then, when an idle path is found, the corresponding state store bits are set to "busy" and the appropriate information is loaded into the control stores. When discontinuing a connection, the control stores are accessed to determine which state store bits must be set to idle. Although FIG. 3 shows the state store 29 as being distinct from the control store 25, in some implementations it is desirable to incorporate both functions into one piece of equipment. In these instances the control information and the status of the respective switching element can be obtained by a single access to one device. Master clock is distributed to all switching elements, as indicated by the timing distribution bus from master clock source 30. Thus, the NXN space switch 23 that, in FIG. 3, is a square switch with an equal number of input and outputs, is operated in time divided fashion in synchronism with the time stages. This is with all operations cyclic, so that data occurring in each time slot of successive incoming frames is transferred to the same time slot (channel) of successive outgoing frames.

The best structure of a space switch is dependent on the number of inputs and outputs it services. A single stage square space switch, such as the NXN space switch 23 of FIG. 3, is generally most attractive for small switches. Large switches, however are more attractively implemented with multiple stages. Time folded operation TST switches are particularly useful in all switch sizes with any number of space stages used.

Referring also to FIG. 4, the folded operation of TST switch 31 automatically sets up the second connection of a full duplex operation when the first connection is set up in a particularly useful fashion using successive switch time slots for the two connections. That is, one space switch 32 transfer is made during an even time slot and the other transfer is made in a symmetric fashion during the following odd time slot, such as shown in FIG. 4, for a connection between channel 2 of line 1 and channel 17 of line 15. In the example shown, as a typical example, switching time slot 22 has been selected for the transfer from inlet 1 to outlet 15, with the time folded operation then using time slot 23 for the reciprocal transfer from inlet 15 to outlet 1. The T1 inlet memories 33(1), 33(2), . . . 33(15) are like the T1 memories 22 of FIG. 3, and the T2 outlet memories 34(1), 34(2), . . . 34(15) are like the T2 memories 24 of FIG. 3. The various elements of TST switch 31 are controlled by cyclicly retrieving control information from a set of memories, called control stores, just as with the embodiment of FIG. 3. New connections are established and old ones removed through updating of the information stored in the control stores, one of which is associated with each inlet memory, space stage output, and outlet memory. The control stores contain one word for each time slot, with the information stored in the words specifying which connections are established during the respective time slots.

The pathfinding operation of a time folded TST switch begins by searching all appropriate space paths during even time slots to complete a path from originating inlet 0 to terminating outlet N-1 through the TST switch of FIG. 3, as an example. If an idle path is found, the corresponding connection from inlet N-1 to outlet 0 is automatically available during the next odd time slot. If no idle path from inlet 0 to outlet N-1 is found during an even time slot, then a path search from inlet N-1 to outlet 0 is begun by searching all appropriate space paths during even time slots. If an idle path is found, the corresponding connection from inlet 0 to outlet N-1 is automatically available during the following odd time slot. Notice that searching for a connection from inlet N-1 to outlet 0 during even time slots is equivalent to searching for a path from inlet 0 to outlet N-1 during odd time slots. Thus, all $l$ time slots are available for completing any particular full duplex connection even though the first half connection involves a search of only even time slots. Since the second half connection is always available when the first half connection is established, the time folded operation cuts the blocking probability to one-half that occurring if both halves of a connection are established independently. When switch elements for one path are marked busy during an even time slot, respective elements in the mirror image of the first path are marked busy during the following odd time slot. For example, when inlet 0 of FIG. 3 is marked busy during an even time slot, outlet 0 is marked busy during the following odd time slot. Since status of respective elements are related in this way, the state stores associated with the respective elements can be combined. This pathfinding operation is applicable to all the time folded TST switch embodiments set forth herein or suggested by the teachings hereof.

Note that certain full duplex connections through a TST switch with a single square space switch could be made, using the same time slot for both directions of the connecting path. This approach has the disadvantage of not allowing interconnection of two time-division channels on a common connecting TDM input/output. For example, in FIG. 3, it would not be possible to interconnect channels 4 and 9 of TDM input and output 1. In some applications, it may be desirable to have this type of connection. Also, using the same time slot for both directions would not allow proper operation with a multi-stage space switch. In particular, full duplex connections could not be established between inlet and outlet memories which shared the same inlet and outlet space switch stage arrays. Doubling the speed of the connecting links in FIG. 3 would allow such operation. Alternatively, and advantageously, applicants' method of using alternate time slots for opposite directions allows a full duplex connection without increasing the speed requirements and without increasing the blocking probability.

Conceptual operation of an inlet memory is illustrated in FIG. 5, with data from successive channels (time slots) of the input stored in successive addresses of the inlet memory 33 (or, 22). Control store 35 is accessed in synchronism with the switching time slots to retrieve the desired inlet data. Using inlet 1 as an example, the data from incoming channel 2 is accessed during switch time slot 22 by storing the value 2 in control store location 22. Outlet memories, such as outlet memory 34 illustrated in FIG. 6, operate in a similar fashion except that the control stores 36 specify which memory address is written into during respective switch time slots. Outgoing data is then obtained by cyclicly accessing successive outlet locations for the corresponding output channels such as illustrated in FIG. 6, for outlet 15 of the example connection, through the TST switch 31 of FIG. 4. Data from the space switch is stored in location 17 during switch time slot 22. This data is then retrieved for transmission during output time slot 17. Note that outlet 34(1) in the example would store the value 2 in location 23 of its control store 36. Similarly, inlet 35(15), of FIG. 4, would store the value 17 in location 23 of its control store 35. Further, the information required by inlet 33(1) during time slot 22 is identical to the information required by outlet 34(1) during time slot 23. Similarly, the information required by inlet 33(15) during time slot 23 is identical to the information required by outlet 34(15) during time slot 22. Thus, by virtue of the time folded operation, respective inlet and outlet memories can share a control store by exchanging control information during alternate time slots.

The conceptual implementation of a switching element for time divided space switches, such as space switch 32 of FIG. 4 (or, space switch 23 of FIG. 3), is shown in FIG. 7. The switch element shown, usable as a basic building block for space switches with any number of stages, has a plurality of crosspoints 37($\phi$), and 37(1) through 37(N-1) for $\phi$ and 1 through N-1 inputs to one output line 38. Actually, there is a plurality of output lines (detail not shown) within a square space switch, the number of output lines 38 equaling the number of input lines. Again, a control store (store 39) is accessed in synchronism with the switch time slots to select the desired inputs for ech transfer. For example, with the single stage space switch 32 of FIG. 4, space stage output 15 would have value 1 stored in location 22 of its control store 39 (FIG. 7). Similarly, space stage output 1 would have the value 15 stored in location 23 of its control store (like store 39 in FIG. 7). A more complete showing of these conceptual implementations is shown in FIG. 8, where many of the working parts are the same as parts shown in FIG. 4, and with control stores having similar designations, as in FIGS. 5, 6, and 7, along with additional location designations. The showing of FIG. 8 is, in essence, a complete specification of a sample connection for a TST switch where the space stage 32 is implemented as a single NXN NXn stage. Control stores 35(1), 39(15), and 36(15), acting on inlet memory 33(1) switch connection 37(1) and outlet memory 34(15), respectively, effect the desired transfer from inlet 1 to outlet 15 during time slot 22. Similarly, control stores 35(15), 39(1), and 36(1), acting an inlet memory 33(15), a second space switch connection, and outlet memory 34(1), respectively, specify and effect the desired transfer from inlet 15 to outlet 1 during time slot 23.

Referring next to FIG. 9, a time folded opertional TST switch configuration is shown having a space switch consisting of two stages S1 and S2. Each of the two stages S1 and S2 is shown to contain N arrays 40(1) through 40(N) and 41(1) through 41(N), respectively, that may be square arrays, or rectangular — depending on the number of interconnections desired between the two space switch stages. If only one connection is desired from each array in S1 to each array in S2, each array in S1 would have N outputs and each array in S2 would have N inputs. For example, arrays S1 40(1) through 40(N) and S2 41(1) through 41(N) could be 8 × 8 and 8× 8 arrays, respectively, as is required for some switching purposes. If two paths between each array are desired, each array in S1 would have 2N outputs and each array in S2 would have 2N inputs. For example, arrays S1 (40(1) through 40(N) and S2 41(1) through 41(N) could be 8 × 16 and 16 × 8 arrays, respectively, as may be required for some switching purposes. In the typical space switch two-stage connection shown in FIG. 9, the first array 40(1) in S1 and the Nth array 41(N) in S2 are used to transfer from inlet 1 to outlet 15. Similarly, the Nth array 40(N) in S1 and the first array 41(1) in S2 are used to effect transfer from inlet 15 to outlet 1. A value N is stored in control store 43(1) to reflect the fact that its corresponding output 1 is connected to an input N from the Nth array of S1.

Referring finally to FIG. 10, time folded operation of a TST switch having three space switch stages S1, S2, and S3, is shown. In this instance, the first and third space switch spaces S1 and S3 are shown to contain N arrays 44(1) through 44(N) and 46(1) through 46(N), respectively, and the second space switch stage S2 is depicted as having 45(1) through 45(M) arrays, a possibly different number M of second stage arrays. The notation designations introduced in FIG. 10 for control stores reflects the fact that there is a plurality of arrays in each stage and a plurality of outputs associated with each stage. Thus, control store 47(1-5) is the control store for the fifth output of the first array 44(1) in S1. This output is connected to the fifth array 45(5) in the second stage S2. One path through the TST implementation shown is established through first stage S1 array 44(1), second stage S2 array 45(5), and third stage S3 array 46(N) by storing the appropriate values in control stores 47(1-5), 48(5-N), and 49(N-15). Similarly, the opposite path is established through S1 array 44(N), S2 array 45(5), and S3 array 46(1) by storing the appropriate values in control stores 47(N-5), 48(5-1), and 49(1-1). Please note that, with this connection, two distinct space paths are used for the two transfers. Thus, both transfers could be made in a single time slot implying a space folded type of operation. If, however, a full duplex connection is to be established between two lines serviced by the same first stage S1 array, and consequently the same third stage S3 array, the use of the same center stage S2 array requires the same physical path, thus precluding use of the same time slot for both transfers.

Whereas this invention is herein illustrated and described with respect to relatively few embodiments hereof, it should be realized that various changes may be made without departing from essential contributions to the art made by the teachings hereof.

We claim:

1. In a time folded time-space-time telecommunication system switch for interconnecting digital time division multiplex communication lines: first path selection means establishing a communication path through the switch in a first direction; second path selection means automatically establishing a communication path through the switch in an opposite second direction; communication time slot control means establishing communication paths in said first direction in even time slots, and communication paths in said second direction, symmetrically, relative to said first direction paths, during respective following odd time slots in selectively interconnecting digital bi-directional time division multiplexed tranmission paths; and including space switch staging means with control memory means associated with output link means of said space switch staging means; said control memory means being the specifying selective control means acting through control decoding circuitry means for selectively connecting space switch staging input links to said output links during successive time slot channel times; and including, switch clock means; input time staging with inlet data memory means; output time staging with outlet data memory means; and with said inlet data memory control means being structured to write data from the inlet link time slots in sequential inlet data memory locations in synchronism with the input connecting link time slots, and to read data randomly in response to read addresses supplied through connecting circuitry from inlet data control store means; and with said outlet data memory control means being structured to write data randomly into outlet data memory means with addresses being supplied through connective circuitry from outlet data memory control store means, and said outlet data memory word locations being read sequentially in synchronism with the output connecting link time slots; with data from the input link time slots being written sequentially into said inlet data memory means in synchronism with the input connecting link time slots, and with the data, having been stored sequentially in the inlet data memory means, subsequently being read in a random access mode with the successive inlet memory addresses being supplied from the inlet data control store means; data being written into said outlet data memory means in a random access mode with successive outlet memory addresses being supplied from said outlet control store means; and, for data, having been written into said outlet memory means in a random access mode, being subsequently read in a sequential manner in synchronism with output connecting link time slots; and with the data transfers being made under control of said switch clock means.

2. The time folded time space time switch of claim 1, wherein inlet data memory means and outlet data memory means share a common control store.

3. The time folded time-space-time switch of claim 1, also including switch control unit means for executing path finding based on first examining state of even time slots, recorded in state store means, from the originating to terminating data memory means, and if an idle time and space path is found, marking the connection in switch control store means with the even time slot used from the originating data memory means to the terminating data memory means and the corresponding odd time slot used for the second return path in a time folded manner; if no idle path is found, a second path search being initiated over even time slots from the termination to originating data memories, and, if an idle time-space path is found, marking the connection in switch control stores means with the even time slot used from the terminating to originating data memory means and the corresponding odd time slot used from the originating to terminating data memory means; and with path finding providing full access to all time slots in accordance with time folded principle and achieving lower blocking probability than non-folded switch operation.

4. The time folded time-space-time switch of claim 1, also including switch control unit means for executing path disconnect based on reading space switch staging control memory means beginning with control memory means for the space stage connected to the outlet memory, the content of said control memory means addressing, and thereby identifying, the input space link which is the output from the previous space switch staging means and, thereby, also the associated control memory means which in turn is read to identify the next input space link, the entire path being thereby traced and the corresponding state store bits set to the idle state; the second return path being automatically identified because of time-folded relationship; and with this being accomplished through structuring of control memory means to consistently identify the next element in the path.

* * * * *